United States Patent [19]

Taube, Sr. et al.

[11] Patent Number: 5,000,219
[45] Date of Patent: Mar. 19, 1991

[54] FLUID FLOW CONTROL REGULATOR

[75] Inventors: Frank A. Taube, Sr., Birmingham; Edward J. Rozniecki, St. Clair Shores, both of Mich.

[73] Assignee: Systems Specialties, Royal Oak, Mich.

[21] Appl. No.: 489,285

[22] Filed: Mar. 6, 1990

Related U.S. Application Data

[62] Division of Ser. No. 214,607, Jun. 30, 1988, Pat. No. 4,922,956.

[51] Int. Cl.$^5$ .............................................. G05D 7/01
[52] U.S. Cl. ................................... 137/501; 137/504; 251/50
[58] Field of Search ................. 137/501, 503, 504; 251/188, 50

[56] References Cited

U.S. PATENT DOCUMENTS

| | | |
|---|---|---|
| 1,186,593 | 6/1916 | Meyer ........................... 251/188 |
| 2,324,946 | 7/1943 | Molloy ........................... 251/50 |
| 2,800,919 | 7/1957 | Kates . |
| 2,859,769 | 11/1958 | Viergutz . |
| 2,950,733 | 8/1960 | Perkins . |
| 2,967,543 | 1/1961 | Viergutz . |
| 2,984,261 | 5/1961 | Kates . |
| 3,040,759 | 6/1962 | Kates . |
| 3,100,620 | 8/1963 | Kates . |
| 3,204,659 | 9/1965 | Richards et al. . |
| 3,223,115 | 12/1965 | Kates . |
| 3,294,361 | 12/1966 | Kates . |
| 3,344,805 | 10/1967 | Wapner ..................... 137/501 X |
| 3,402,735 | 9/1968 | Kates . |
| 3,402,916 | 9/1968 | Kates . |
| 3,590,861 | 7/1971 | Chittenden ..................... 137/501 |
| 3,593,742 | 7/1971 | Taylor . |
| 3,663,071 | 5/1972 | Kates . |
| 3,801,073 | 4/1974 | Kates . |
| 4,044,995 | 8/1977 | Kubota ............................ 251/188 |
| 4,074,693 | 2/1978 | Kates . |
| 4,129,624 | 12/1978 | Kates . |
| 4,669,495 | 6/1987 | Boyce . |
| 4,776,367 | 10/1988 | Hilmersson et al. ............. 137/501 |

FOREIGN PATENT DOCUMENTS 117614 7/1984 Japan ................................. 137/501

OTHER PUBLICATIONS

Brochure: Kates Company, 2101 Waukegan Rd., Deerfield, IL 60015, Bulletin 186.

Primary Examiner—Stephen M. Hepperle
Attorney, Agent, or Firm—Harness, Dickey & Pierce

[57] ABSTRACT

Improved flow control valves are disclosed which are exceedingly accurate in maintaining a constant predetermined flow rate regardless of inlet and outlet pressures. The valves are preferably designed to enable them to be fabricated almost entirely from suitable polymeric composition materials. One embodiment disclosed is extremely well suited for ultra-pure applications which require extreme care to avoid any possible contamination of the liquid flowing therethrough. Another embodiment is disclosed which is designed to achieve substantially zero leakage flow thereby rendering it particularly well suited for use in applications requiring exceedingly precise flow control and in particular relatively low flow rate applications wherein leakage flow is of greater significance.

20 Claims, 7 Drawing Sheets

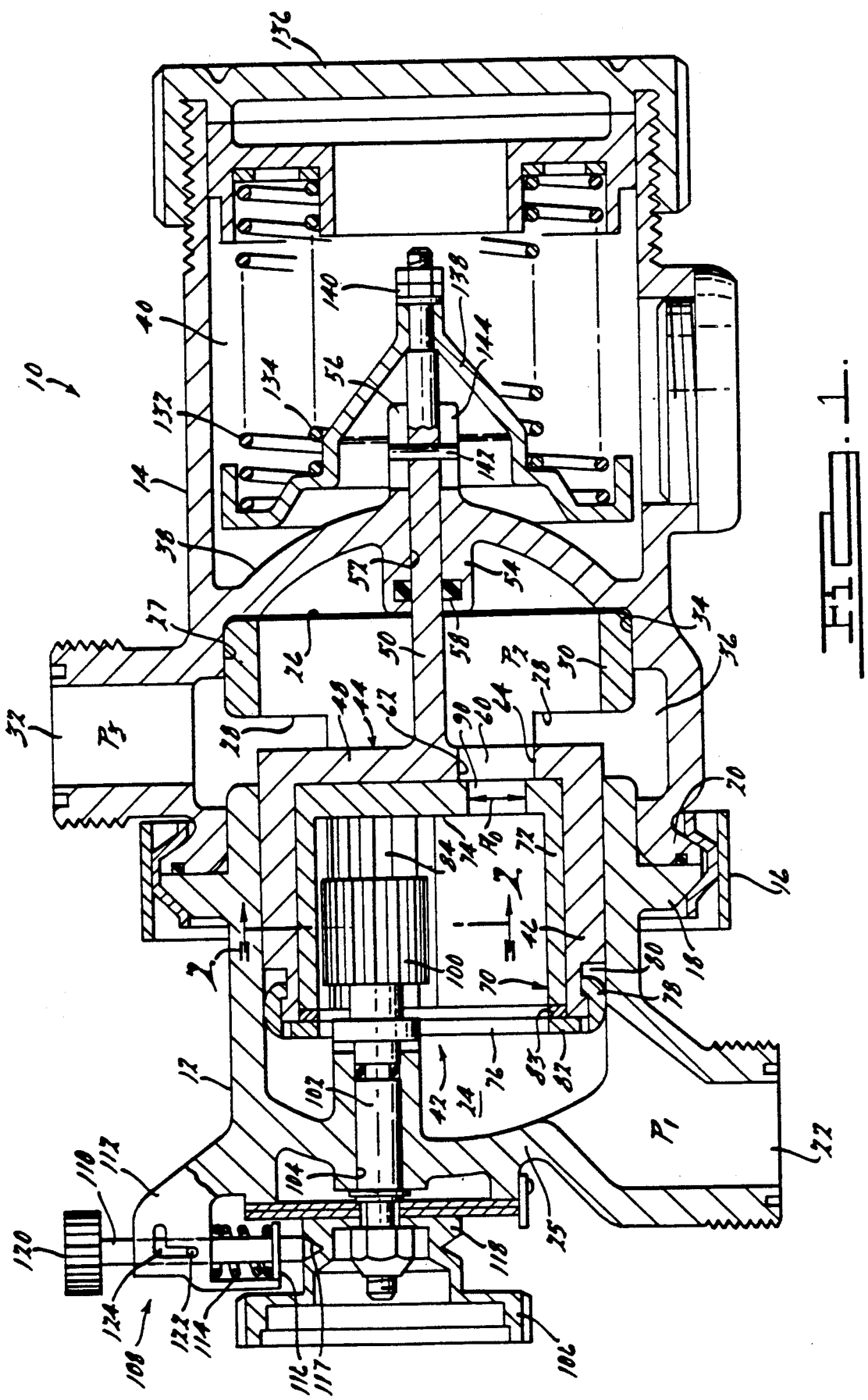

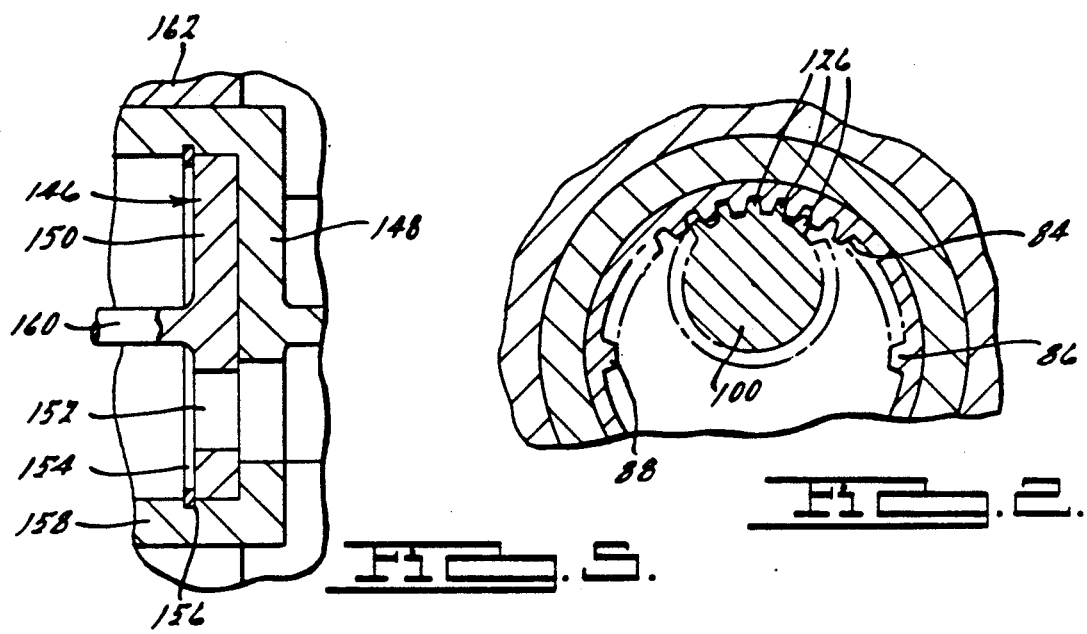
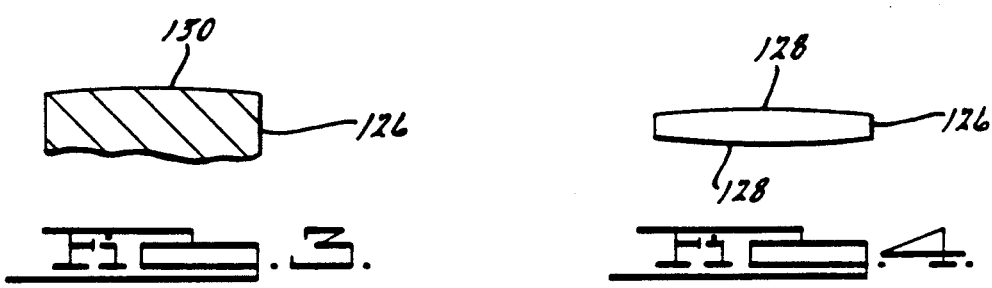
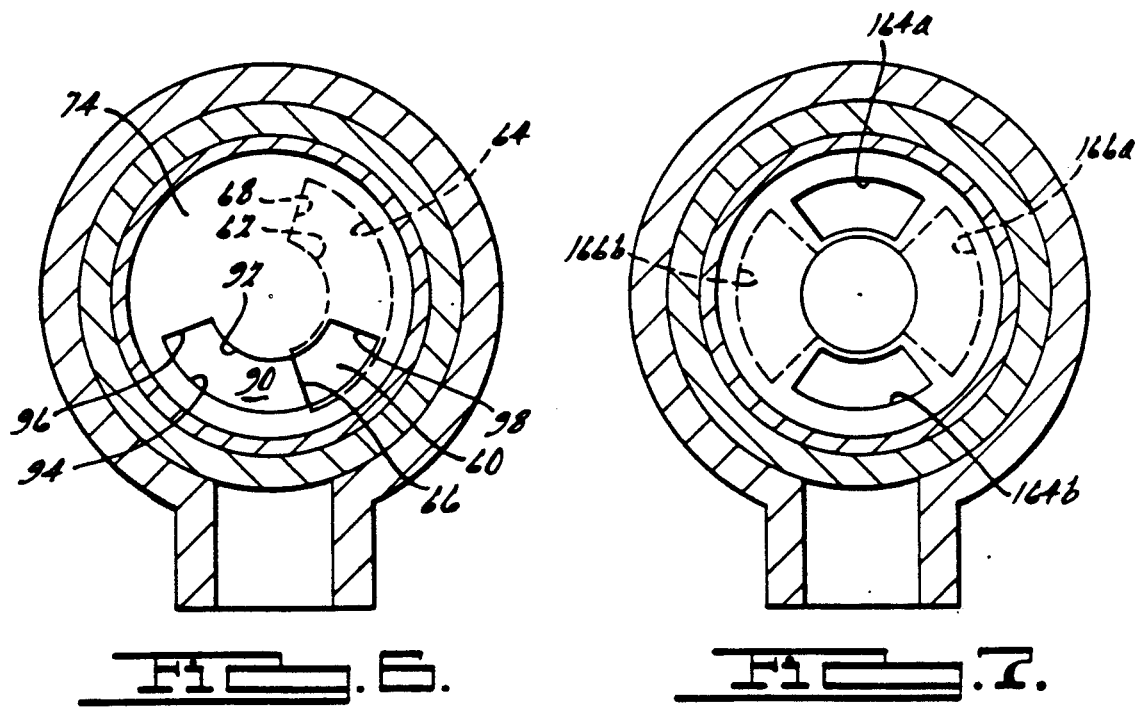

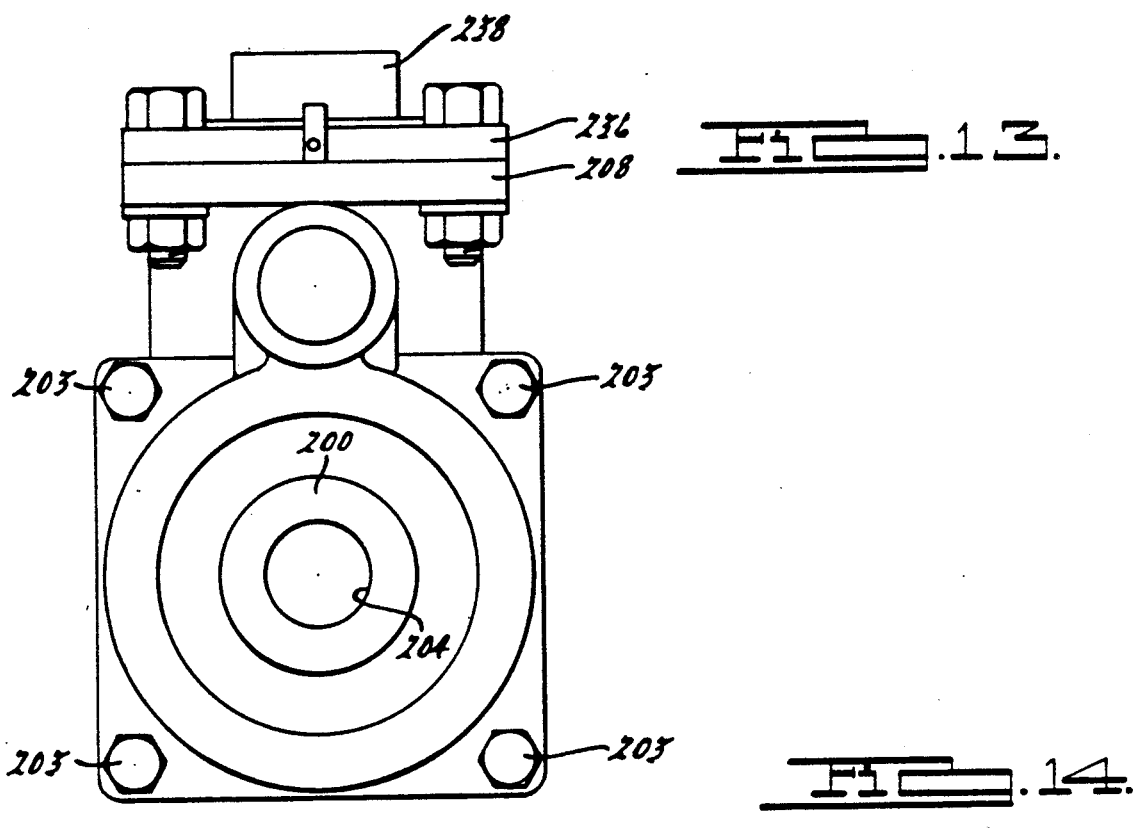
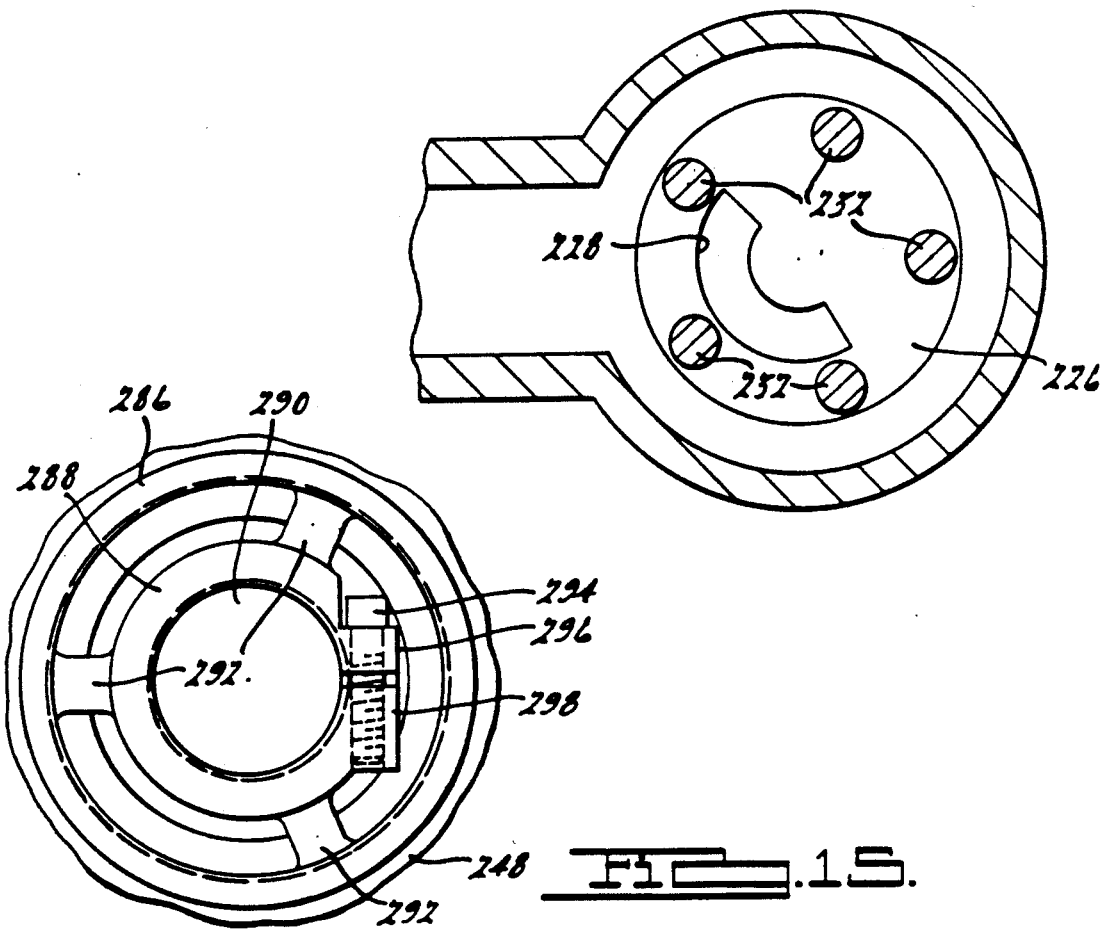

FLUID FLOW CONTROL REGULATOR

This is a division of application Ser. No. 214,607, filed Jun. 30, 1988, now U.S. Pat. No. 4,922,956.

BACKGROUND AND SUMMARY OF THE INVENTION

The present invention relates generally to flow control valves and more specifically to such valves which are designed to maintain a constant predetermined flow rate independent of fluctuations in inlet and/or outlet pressures.

A wide variety of applications exist wherein it is important to accurately control the rate of flow of a fluid. While such control is quite easily accomplished when the inlet and outlet pressures of the fluid are maintained constant, it is often not possible to achieve such a constant pressure condition. Thus, in these situations it is necessary for the flow regulator to incorporate means to automatically compensate for variations in either the inlet pressure or the outlet pressure or both.

This is typically accomplished by incorporating a variable orifice the size of which is controlled by an axially movable member having opposed pressure surfaces and spring biasing means operable such as to maintain a constant flow rate across the orifice. These valves must also incorporate a second orifice which has a permanently fixed area or a manually adjustably fixed orifice whereby the predetermined flow rate may be adjusted to the desired level.

While there exist many different types of valving arrangements operable to achieve constant adjustable preset flows, these valves are not totally satisfactory in that the pressure and flow rate ranges over which they are able to maintain a desired level of accuracy are relatively small hence necessitating manufacture and possible stocking of a substantially greater number of designs in order to accommodate the full range applications.

Additionally, in more recent times there have developed applications wherein it is desirable to incorporate flow control valving in connection with cleaning or purifying end product components. Such applications, commonly referred to as "ultra-pure", include portions of the electroncis industry wherein it is absolutely imperative that the cleaning fluid be devoid of even the smallest electrically conductive particle contamination and hence it is especially important to avoid any metal components within the flowpath through the valve. Other "ultra-pure" applications may be concerned with other forms of contamination such as bacteria growth for example. It is possible for such bacteria growth to occur in small pockets of low fluid turbulence within such valve structures even though the fluid is continuously flowing therethrough.

Additionally, virtually all flow control valves of which the applicant is aware have some degree of leakage across adjacent metering and/or moving surfaces. While this leakage may be minimized such as to become relatively insignificant with respect to relatively high flow rates, this leakage factor does become a significant error factor in valves used for relatively low flow rates.

The present invention, however, provides an improved adjustable flow control valve which is specifically designed to overcome the problems noted above and other disadvantages associated with prior designs. In one embodiment, a manually adjustably fixed orifice is positioned within the axially facing surface of the control piston thus not only enabling adjusting control of the flow rate but also providing for a change in surface area against which the pressure forces are acting. This arrangement serves to both significantly improve the accuracy of the control valves within the same typical ranges of existing valves as well as to provide comparable accuracy to that offered by conventional flow control valves over a substantially greater range. Also, the pressure compensating spring biasing means are remotely located outside of the fluid flowpath thus eliminating these elements as a potential source of contamination of fluid flowing therethrough. This embodiment is well suited for fabrication from various polymeric compositions or when intended for high pressure applications from suitable metal alloys.

Another embodiment of the present invention is also disclosed which is well suited for fabrication from suitable polymeric compositions. This embodiment is specifically designed to provide a substantially zero leakage flow control valve and incorporates a rolling diaphragm approach to achieve a positive seal between the various chambers. Because of the zero leakage, this embodiment affords extremely precise accurate fluid flow control particularly at very low flow rates where small leakages may create a significant error in total flow.

Additional advantages and features of the present invention will become apparent from the subsequent description and the appended claims taken in conjunction with the accompanying drawings.

BRIEF DESCRIPTION OF THE DRAWINGS

FIG. 1 is a sectioned view of a flow control valve in accordance with the present invention, the section being taken along a radial plane extending along the longitudinal axis of the valve.

FIG. 2 is a fragmentary sectioned view showing the adjustable orifice drive gear arrangement, the section being taken along line 2—2 of FIG. 1.

FIG. 3 is an enlarged fragmentary longitudinal section view of a single tooth of the adjustable orifice drive gear.

FIG. 4 is an enlarged plan view of a single tooth of the adjustable orifice drive gear.

FIG. 5 is a fragmentary section view showing an alternative adjustable orifice construction in accordance with the present invention.

FIG. 6 is a section end view of the valve of FIG. 1 showing the manually adjustably fixed orifice arrangement thereof.

FIG. 7 is a view similar to that of FIG. 6 but showing an alternate arrangement all in accordance with the present invention.

FIG. 13 is a left end view of the valve of FIG. 12.

FIG. 14 is a section view of the adjustable orifice incorporated in the valve structure of FIG. 12, the section being taken along line 14—14 thereof.

FIG. 15 is a fragmentary section view of the valve assembly of FIG. 12, the section being taken along line 15—15 thereof.

DESCRIPTION OF THE PREFERRED EMBODIMENTS

Figure 8:
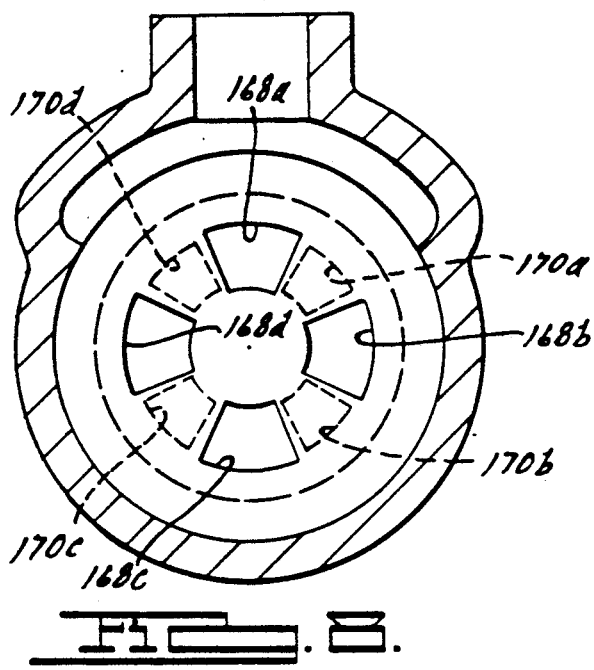
FIG. 8 is another view similar to FIG. 6 but showing a further alternative arrangement and also showing the manually adjustably fixed orifice incorporated in the valve of FIG. 1.

Referring now to the drawings and in particular to FIG. 1, there is shown a flow control regulator in accordance with the present invention indicated generally at 10. Flow control regulator 10 comprises a housing defined by an inlet housing portion 12 and an outlet housing portion 14 secured together in partial telescopic relationship by suitable annular clamp means 16 engaging respective generally radially outwardly projecting flange portions 18 and 20 provided on respective housing portions 12 and 14.

Inlet housing portion 12 is generally cylindrical in shape and includes a suitable inlet port 22 opening generally radially inwardly into a chamber 24 adjacent a closed outer end 25 thereof. Inlet port 22 is suitably designed to accommodate connection of a fluid supply line (not shown) thereto. The opposite end 26 of inlet housing 12 is open and includes a plurality of circumferentially elongated spaced slots 28 in the sidewall 30 adjacent end 26.

Outlet housing 14 is also generally cylindrical in shape and includes an outlet port 32 opening generally radially inwardly into a bore 34 which is sized so as to telescopically receive open end portion 26 of inlet housing portion 12. Outlet port 32 is also suitably designed to accommodate connection of a fluid line (not shown). An enlarged diameter annular groove 36 is provided within bore 34 positioned so as to place each of slots 28 in fluid communication with outlet port 32. A generally arcuate or bowed partition 38 is provided within outlet housing portion 14 intermediate the ends thereof and is positioned so as to provide a small clearance with the inner end 26 of inlet housing portion 12 thereby closing off the open end thereof as well as in part defining a second axially elongated chamber 40. Preferably the inside diameter of bore 34 and outside diameter of sidewall 30 will be such as to create a slight interference fit therebetween.

A piston assembly 42 is axially movably disposed within chamber 24 and comprises a generally cup-shaped piston member 44 defined by cylindrical sidewalls 46 and an end plate 48. A centrally located elongated stem portion 50 integrally formed with piston member 44 extends axially outwardly from one side of plate 48 through a suitable guide opening 52 provided in partition 38 and into chamber 40. Preferably guide opening 52 will be defined by suitable oppositely axially extending bosses 54, 56 integrally formed with partition 38 so as to increase the overall length of opening 52 and thus facilitate the guided sliding movement of stem 50. Preferably a suitable seal 58 will be fitted within opening 52 provided in boss 54 so as to prevent fluid communication between chambers 24 and 40.

As best seen with reference to FIGS. 1 and 6, end plate 48 of piston 44 is provided with an opening 60 of generally arcuate shape and defined by arcuately extending radially spaced inner and outer walls 62, 64 and radially extending circumferentially spaced sidewalls 66, 68.

Piston assembly 42 also includes a generally cup-shaped manually adjustably fixed orifice member 70 movably disposed within piston 44 and defined by annular cylindrical sidewall 72 and an end plate 74. The outer surfaces of sidewall 72 and end plate 74 closely conform to the contours and size of the inner surfaces of sidewall 46 and end plate 48 of piston 44 so as to form a relatively fluid tight slidable sealing engagement therewith.

In order to retain manually adjustably fixed orifice member 70 in assembled relationship with piston 44, an annular hinged snap member 76 is provided having a plurality of circumferentially spaced axially extending finger portions 78 adapted to engage an annular groove 80 provided on the radially outer surface of sidewall 46 of piston 44 and a generally radially inwardly extending annular flange portion 82 overlying the axially facing edge of sidewall 72 of manually adjustably fixed orifice member 70 and interconnecting finger portions 78. A plurality of suitable annular shims 83 may be interposed between the edge of manually adjustably fixed orifice member 70 and flange portion 82 to insure end plate 74 is urged into a positive sealing engagement with end plate 48 of piston 44. A plurality of axially extending internal gear teeth 84 are also integrally formed on the inner surface of sidewall 72 extending circumferentially over approximately 180° of arc and axially over the entire length of sidewall 72 as best seen with reference to FIG. 2. Preferably, suitable abutments 86, 88 will be provided at opposite circumferential ends of gear teeth 84. Additionally, as shown in FIGS. 1 and 6, adjustment member will also include an arcuate opening 90 in plate 74 defined by radially spaced arcuately extending sidewalls 92, 94 and radially extending circumferentially spaced end walls 96, 98. Preferably, as best seen with reference to FIG. 6, opening 90 will be positioned with respect to opening 60 in end plate 48 of piston 44 such that it may be moved from a non-overlapping position into partial overlapping or complete overlying relationship therewith. Further, it should be noted that preferably the radial spacing between sidewalls 92 and 94 will be slightly less than that betweeen sidewalls 62 and 64 and similarly the circumferentially spacing between end walls 96 and 98 will be slightly less than the circumferential spacing between end walls 66 and 68 such that when openings 60 and 90 are positioned in aligned relationship, the size of the maximum area flowpath defined thereby will be delineated by sidewalls 92, 94 and end walls 96, 98 only. Any other orifice area will be defined by sidewalls 92, 94 and end walls 66 and 98.

In order to effect rotary movement of adjustment member 70, a suitable elongated external gear member 100 is provided being secured to an inner end of shaft 102 within chamber 24. Shaft 102 extends outwardly from chamber 24 through an opening 104 provided in end 25 of housing portion 12 and has secured to the other end thereof a suitable knob or handle 106 by which shaft 102 and hence external gear 100 may be rotated. As external gear member 100 is positioned in meshing engagement with internal teeth 84 provided on manually adjustably fixed orifice member 70, rotation of external gear 100 will operate to rotate manually adjustably fixed orifice member 70 so as to move opening 90 from a position in which no portion thereof overlaps opening 60 to a position in which opening 90 fully overlaps opening 60.

In order to inhibit inadvertent movement of shaft 102 once a desired orifice size has been set, a locking mechanism 108 is provided on housing portion 12. Locking mechanism 108 comprises a shaft 110 movably supported on arm portion 112 of housing portion 12. A spring 114 acts against a flange or washer 116 provided on shaft 110 so as to bias an end portion thereof into engagement with a selected one of a plurality of indentations 117 provided on a hub portion 118 of knob 106. A knob 120 is provided on the opposite end of shaft 110 in order to enable the locking mechanism to be released such as for adjustment of the orifice size defined by openings 90 and 60. A latching arrangement is also provided which comprises a radially outwardly projecting pin 122 on shaft 110 movable in elongated L-shaped slot 124. Thus, shaft 110 may be moved out of engagement with recess 117 by pulling upwardly on knob 120 and latched in the released position by slightly turning knob 120 so as to move pin 122 into the circumferentially extending portion of slot 124. Knob 106 may then be easily rotated to effect rotational movement of manually adjustably fixed orifice member 70 thereby varying the size of the orifice defined by overlapping openings 60 and 90. Once the desired setting is achieved, pin 122 may be moved out of the circumferentially extending portion of slot 124 thereby enabling shaft 110 to move into recess 117. It should be oted that recess 117 may be in the form of an annular groove if desired thereby providing an infinite number of positions at which shaft 102 may be positioned with the frictional engagement of shaft 102 with recess 117 being operative to inhibit relative rotation.

As previously noted, piston assembly 44 is movable within chamber 24. In order to minimize possible restriction to this movement from friction between external gear 100 and internal teeth 84, external gear 100 is provided with teeth 126 (see FIG. 2), the circumferentially opposite flanks or sidewall 128 of which are slightly outwardly bowed or convex shaped as shown in FIG. 4. Similarly, the radially outer surface 130 of each tooth 126 is also radially outwardly bowed or convex shaped as shown in FIG. 3. This contouring operates to accommodate manufacturing misalignments due to tolerances and to minimize the surface area of engagement with internal teeth 84 which preferably have generally planar surfaces and hence minimize the resulting frictional resistance to axial movement of piston assembly 44. It should be noted in addition teeth 126 and 84 may be coated with a suitable friction reducing film material.

In order to bias piston assembly 44 to the left as shown in FIG. 1 whereby slots 28 are fully open, a pair of helical coil springs 132 and 134 are provided within chamber 40 acting between a threaded end cap 136 and a suitably shaped spring seat member 138 secured to the end of shaft 50 by means of a suitable threaded fastener 140. Thus, springs 132 and 134 will operate to bias piston assembly 44 to the left as seen in FIG. 1 whereby no portion thereof overlies circumferentially elongated slots 28. As the fluid pressure at the inlet end of chamber 24 increases, the force exerted on piston assembly 42 thereby will operate to overcome the biasing action of springs 132, 134 thereby causing piston assembly 42 to move to the right (as seen in FIG. 1) and into overlapping relationship with slots 28 thereby partially or fully closing off same.

In order to prevent rotation of piston member 44 during both operations and rotational adjustment of manually adjustably fixed orifice member 70, pin member 142 is provided extending diametrically through shaft 50 within chamber 40 and is axially slidably movable within an elongated slot 144 provided in boss 56.

In order to describe the operation of flow regulator 10, let us first assume manually adjustably fixed orifice member 70 is positioned relative to piston member 44 such that openings 90 and 60 are in a non-overlapping fully closed position. In this situation a fluid entering inlet port 22 and having a pressure $P_1$ will exert a force on piston assembly 44 via surface 74 of manually adjustably fixed orifice member 70 and that portion of the corresponding surface of piston 44 underlying opening 90 in manually adjustably fixed orifice member 70. This force (equal to $P_1$ times the total axially facing surface area $A_T$) will overcome the biasing action of springs 132, 134 thereby causing piston assembly 44 to move to the right as seen in FIG. 1 into overlying relationship with elongated slots 28 until such time as this force is balanced by the spring biasing force $F_S$. As manually adjustably fixed orifice member 70 is rotated slightly so as to move opening 60 into partial overlapping relationship with opening 90, the total surface area $A_T$ against which inlet pressure $P_1$ acts will be reduced by an amount $A_o$ equal to the surface area of the resulting opening. Hence $A_T = A_m - A_o$ and the resulting force acting to move piston assembly 44 to the right will be equal to $P_1 \times A_T = P_1 (A_m - A_o)$ where $A_m =$ the maximum axially facing surface area.

However, the overlap between openings 60 and 90 creates a fluid flowpath through piston assembly 44 with a resultant pressure drop thereacross such that a pressure $P_2$ will occur on the downstream side of piston assembly 44. This pressure $P_2$ will act against the rear (or downstream) surface of piston assembly 44 to generate a force cooperating with the biasing action of springs 132, 134 to oppose the force resulting from pressure $P_1$. Hence, as the total force resulting from pressure $P_1$ has decreased slightly due to the reduction of surface area against which it may act, the spring biasing force will attempt to cause piston assembly 44 to move to the left. Additionally, the force resulting from pressure $P_2$ will also add to the spring biasing force, hence piston assembly will be moved to the left until such time as the force from pressure $P_2$ plus the spring biasing force equal the force from pressure $P_1$. As manually adjustably fixed orifice member 70 is further rotated, the opening 90 will be moved into increasing overlap with opening 60 such that area $A_o$ will be increasing and the pressure drop thereacross will decrease thus increasing $P_2$ and decreasing the assistance required from springs 132, 134 needed to balance the force exerted on piston assembly 44 by pressure $P_1$.

Were there no outlet for fluid flow, pressure $P_2$ would rise until it equalled pressure $P_1$. However, as piston assembly 44 moves to the left as seen in FIG. 1, slots 28 will be progressively uncovered thereby creating a second orifice and a flowpath to outlet 32. As the orifice at slots 28 will introduce a further pressure drop thereacross, the outlet will be at a pressure $P_3$ which will always be less than $P_2$.

In use, once a particular flow rate is set, the control apparatus will automatically compensate for any changes in inlet or outlet pressures ($P_1$ and/or $P_3$) so as to maintain a substantially constant flow rate. For example, as pressure $P_1$ increases, the pressure drop across the orifice defined by overlapping openings 60 and 90 will increase. The increase in pressure $P_1$ will effect movement of the piston assembly in a direction to reduce the exposed area of slots 28 thereby restricting flow to outlet 32. As the flow is restricted, pressure $P_2$ will increase thus counteracting the force on piston assembly 44 resulting from the increased pressure $P_1$. In addition, springs 132, 134 will be slightly compressed thereby increasing their contribution to the force counteracting the increased force from pressure $P_1$ until such time as a new equilibrium has been reached. The net effect is that the variable orifice defined by slots 28 and the rear edge of piston 48 will decrease in size with increasing inlet pressure $P_1$ such as to maintain a substantially constant rate of flow through regulator 10 regardless of inlet pressure.

Similarly, as pressure $P_3$ increases (assuming constant inlet pressure), the pressure drop across the variable orifice defined by slots 28 will decrease and pressure $P_2$ will increase thus causing piston assembly 44 to move in a direction to increase the size of the variable orifice again to maintain the desired flow rate therethrough.

Because the manually adjustably fixed orifice is disposed within the moving piston assembly 44, it enables the actual area against which such pressure variations act to be increased with decreasing flow rates thereby increasing the sensitivity and hence greatly increasing the range of flow rates over which a single valve may be utilized and yet still maintain the desired degree of accuracy. In this regard, it should be noted that as springs 132 and 134 are compressed, the total force required for each additional increment of compression increases as is typically expected with helical coil springs. Hence, the spring force versus spring deflection is a proportional or linear relationship. However, because the adjustably fixed orifice member used to select the desired flow rate is located in and varies the surface area against which pressure $P_1$ acts, it can offset this spring force relationship so as to provide a resultant linear relationship over a very broad range of flow rates thus providing the necessary accuracy of control over the entire range. More specifically, as the flow rate is progressively decreased by reducing the area of overlap between openings 60 and 90, each incremental increase in the surface area against which pressure $P_1$ may act will represent a progressively smaller but proportional percentage of the total surface area and hence a linear relationship which offsets the proportional or linear spring force relationship. Additionally, it should be noted that as the fixed orifice size is manually reset to provide lower flow rates, the fixed orifice and variable orifice flow velocities will remain constant since the resulting change in the area of the variable orifice ($A_v$) is directly proportional to the change in the force acting on piston assembly 44 as a result of the change in the size of the fixed orifice. However, in the present invention, the increased surface area in the piston assembly against which pressure $P_1$ acts will result in higher forces moving the piston thereby resulting in a new smaller variable orifice area ($A_v$) which is equal to the new fixed orifice area ($A_o$) once steady state conditions have been reestablished. Thus, any setting of the fixed orifice area ($A_o$) will result in a variable orifice area $A_v$ equal to $A_o$ assuming steady state operating conditions (i.e. constant pressures $P_1$ and $P_3$ and sufficient time for transients to have dissipated). It is these factors which enable the flow control regulator of the present invention to offer the desired accuracy of control over such a broad range of flow rates.

It should be noted that the effective spring rate of springs 132, 134 affects both flow control stability and the variable orifice sensitivity as does the shape and size of slots 28 during pressure compensation or regulation, for example, slots 28 can vary in number and from a long axial dimension with a relatively small circumferential length to an extremely large circumferential dimension with a short axial length. Preferably, the longer the axial dimension for a given total maximum surface area of slot 28, the softer the spring rate may be and the longer the circumferential dimension for a given maximum opening area of slot 28, the stiffer the spring rate must be as only a slight axial movement of piston assembly 44 will result in a substantial change in the size of the resulting opening. The spring rate must be selected so as to be capable of changing the variable orifice area $A_v$ so as to make it equal to the area of the fixed orifice $A_o$ during steady state operating conditions and to compensate for changes in fluid flow forces resulting from dynamic fluctuations in inlet or outlet pressures ($P_1$ or $P_3$). Of course, it is also important to select the spring rate such that it is compatible with the natural frequencies of the flow control regulator such that pressure variations or fluctuations do not result in undampened oscillations of the piston.

As may now be apparent, flow control regulator 10 is specifically designed to provide an extremely accurate flow control regulator which because of the unique manually adjustable fixed orifice arrangement described above is exceedingly accurate over a much broader range of flow rates thus substantially reducing the number of different models required to cover a desired range of applications. Further, the flow control valve of the present invention is well suited to be fabricated from suitable polymeric compositions. Additionally, because the biasing spring assembly is located outside the flowpath, the number of obstructions and pockets wherein fluid stagnation may occur is substantially reduced thus rendering the present invention ideally suited for ultra-pure flow applications discussed above.

Referring now to FIG. 5, a modified adjustment member 146 is illustrated shown in operative relationship with a piston 148. In this arrangement, adjustment member 146 comprises a generally flat circular plate member 150 having an opening 152 therein which is similar to and corresponds to opening 90 in manually adjustably fixed orifice member 70. A retaining ring 154 is provided being received within a suitable groove 156 is sidewall 158 of piston 148 so as to retain plate number 150 in sealing engagement with the inner end surface of piston 148. In place of the gear drive, a centrally located elongated shaft 160 is provided which may be either integrally formed with or separately attached to plate member 150 whereby rotation of shaft 160 will effect corresponding rotation of plate member 150. Preferably, shaft 160 will extend outwardly of housing 162 and be provided with suitable handle means for effecting rotary movement thereof in the same manner as described above with reference to shaft 102 and may also incorporate similar rotation inhibiting means.

In some applications, the provision of a single set of alignable openings 60 and 90 on one side of piston assembly 44 may result in binding thereof due to the asymmetrical force loading thereon. Accordingly, as shown in FIG. 7, in such applications, it may be desirable to provide two substantially identical sets of alignable openings 164a, 164b and 166a, 166b each of which will be of approximately one-half the surface area of respective openings 90 and 60 for the same flow range. Alterantively, should it be desirable to assure even greater force symmetry, four sets of substantially equally spaced openings may be provided as shown in FIG. 8 wherein four sets of openings 168a, 168b, 168c, 168d, 170a, 170b, 170c, 170d are provided. Of course, it should be noted that with increasing numbers of opening pairs, the leakage flow rate will increase due to the decrease in length of the maximum sealing distance between adjacent edges of the openings when in a fully closed or partially open position. Also, sensitivity of the set point adjustment will increase. That is to say, for a 1 degree rotation of knob 106, a substantially greater increase in opening size will occur when four sets of openings are provided versus a single set.

Figure 9:
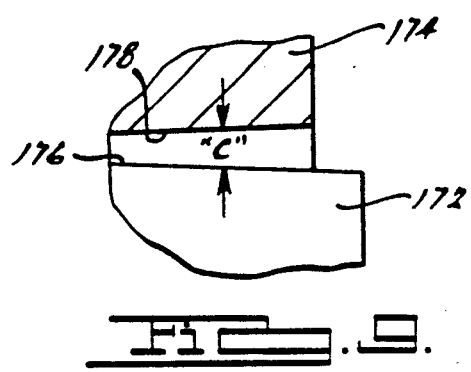
FIG. 9 is an enlarged fragmentary view of portions of the pressure compensating piston and housing and illustrating a sealing arrangement therefor.
Figure 10:
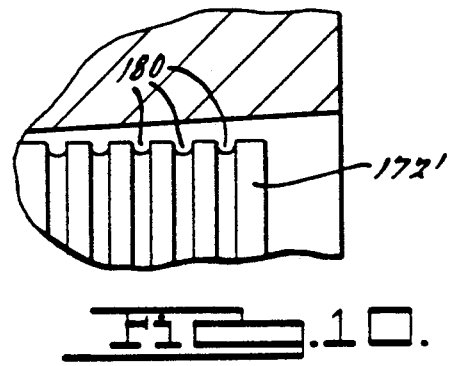
FIG. 10 is a view similar to that of FIG. 9 but showing an alternative sealing arrangement.

Referring now to FIG. 9, there is illustrated an alternative embodiment of a portion of a piston 172 movably disposed within a portion of a cylinder 174 each of which have reversely tapered sidewalls 176, 178 respectively sidewall 178 of which tapers to a minimum diameter at the upstream end whereas sidewall 176 tapers to a minimum diameter at the downstream end. Thus, under low flow rates, the tapered clearance "C" between sidewalls 176, 178 will be greater thus reducing the possibility that piston 172 may stick slightly and hence have a delayed compensating reaction to pressure variations. Of course, incorporation of this tapered sidewall arrangement will result in increased leakage flow at low flow rate settings. It should be noted that alternatively to tapering both sidewalls 176, 178, it is possible to achieve these same advantages by tapering only one of the sidewalls while maintaining the other at a constant diameter.

It is also possible to reduce the potential for increased resistance to piston movement due to side loading on the piston by providing a plurality of annular grooves 180 adjacent the downstream end of piston 172'. Grooves 180 will operate to maintain substantially equal fluid pressure around the entire circumference of piston 172' although again they may result in increased liquid leakage flow.

Figure 11:
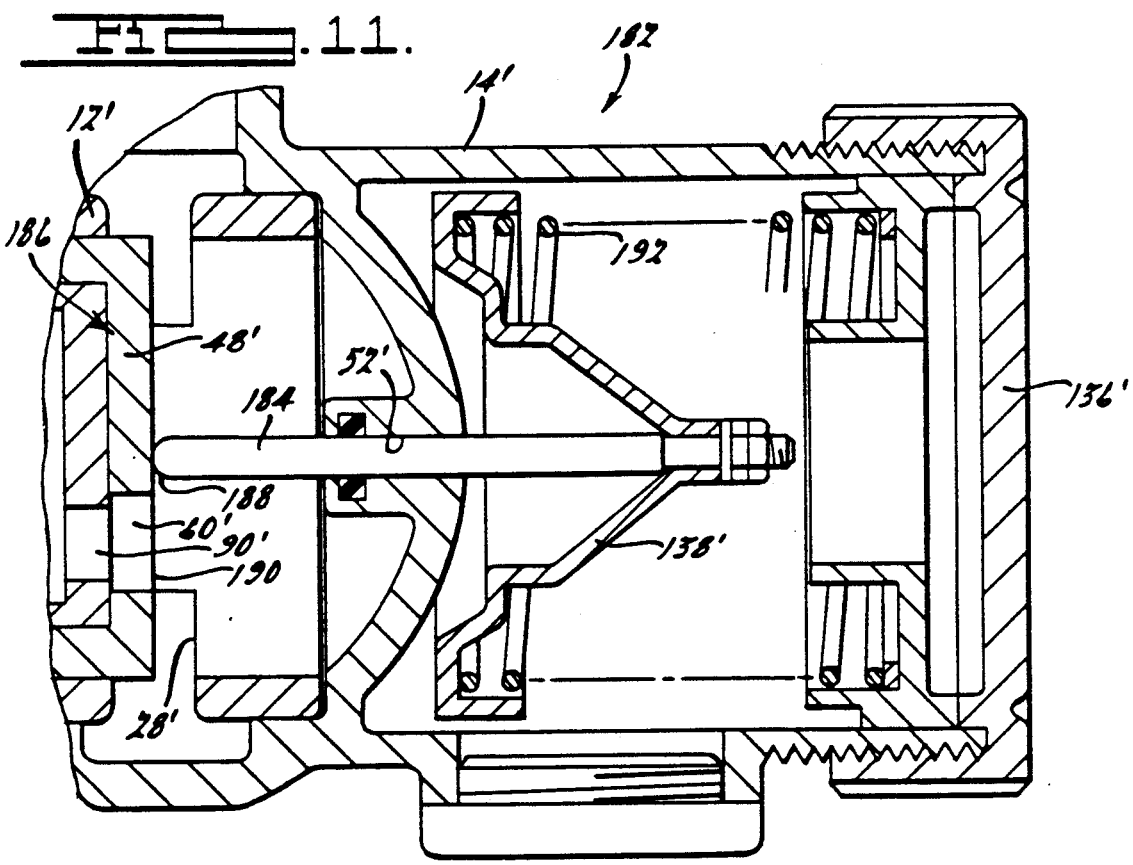
FIG. 11 is a fragmentary section view of an alternative arrangement for biasing the variable orifice piston for the valve of FIG. 1, all in accordance with the present invention.

A portion of another embodiment of a flow control regulator in accordance with the present invention is illustrated in FIG. 11 being indicated generally at 182. Flow control regulator 182 employs a rod member 184 which is not integrally formed with piston assembly 186 but rather is separately fabricated and provided with a spherical end portion 188 bearing against surface 190 of piston assembly 186. Thus, piston assembly 186 will be entirely free to float within chamber 24 as any lateral restriction due to the guided rod 184 has been eliminated. Of course, it will be necessary to incorporate some means such as a keyway to prevent relative rotational movement of piston 48' in place of the pin 142 and slot 144 previously incorporated with guide rod 50. Additionally, a single biasing spring 192 is employed in flow control regulator 182 in place of dual springs 132, 134. The operation of and remaining portions of flow control regulator 182 are substantially identical to flow control regulator 10 described above and are indicated by corresponding numbers primed.

Thus, as may now be appreciated, the flow control regulator 10 is well suited to provide highly accurate, long term, reliable operation over a wide range of flow rates. Additionally, because its design reduces to an absolute minimum the amount of dead flow areas and it is well suited for fabrication from polymeric materials, it is particularly well suited for fluid flow applications requiring ultra-pure fluid.

There also exist many applications wherein it is desirable to provide extremely precise control of fluid flow to the degree that even the slight leakage flow encountered in the flow control regulator 10 described above is undesirable. Another embodiment of the present invention is illustrated and will be described with reference to FIGS. 12 through 19 which overcomes these problems in that it achieves substantially zero leakage flow.

Figure 12:
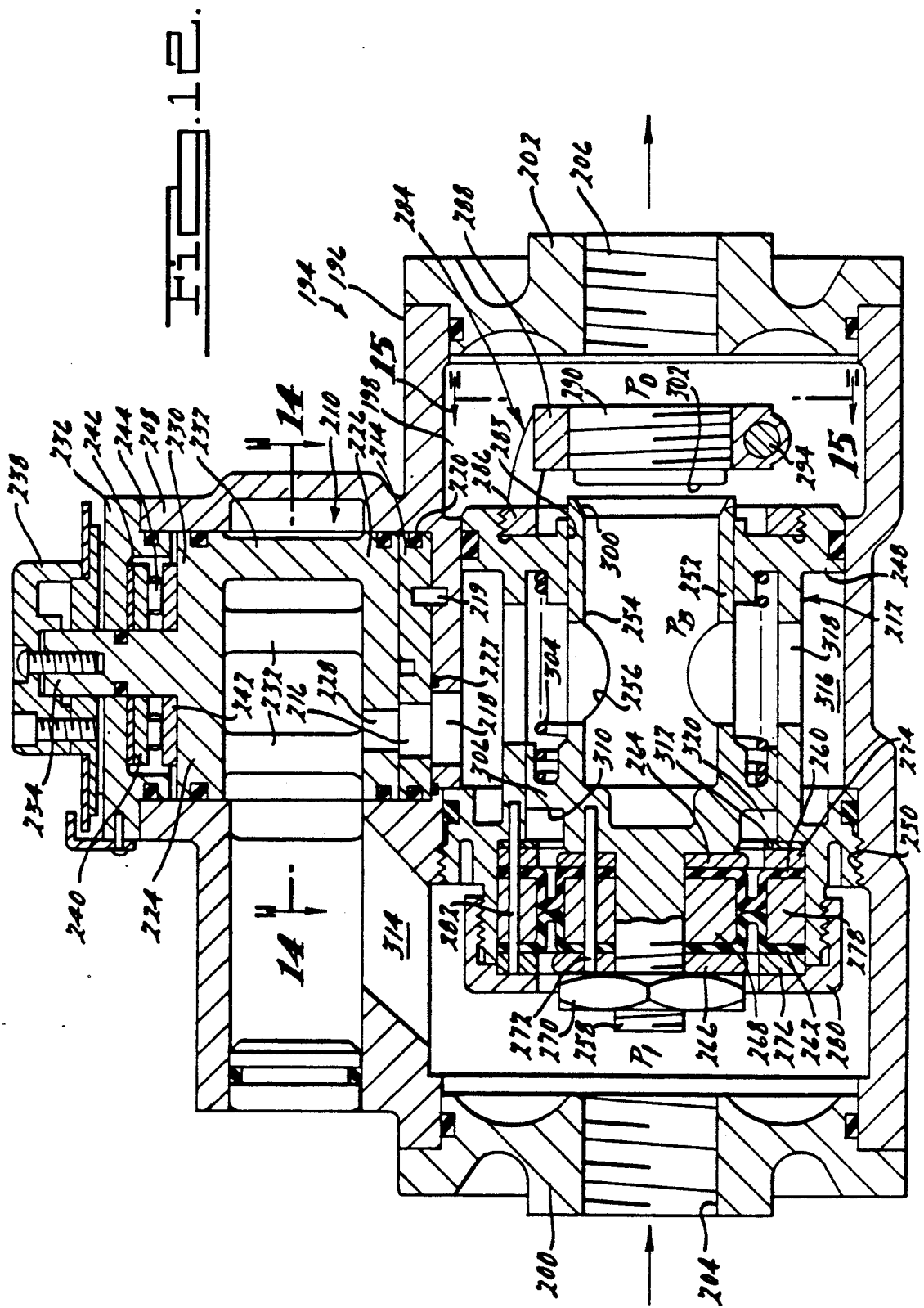
FIG. 12 is a sectioned view of another embodiment of a flow control valve incorporating a zero leakage arrangement in accordance with the present invention, the section being taken along a radial plane extending along the longitudinal axis thereof.

Referring now to FIG. 12, flow control regulator 194 comprises a generally cylindrically shaped elongated housing 196 having a relatively large diameter bore 198 extending axially therethrough. Closure members 200, 202 are provided being secured by bolts 203 (see FIG. 13) or other suitable means for closing opposite ends of housing 196 and include suitably threaded inlet and outlet openings 204, 206 respectively. A generally radially outwardly projecting extension 208 is integrally formed with housing 196 and has disposed therein a manually adjustable inlet orifice valve assembly 210. A variable metering orifice assembly 212 is also fitted within bore 198 of housing.

Manually adjustable inlet orifice valve assembly 210 comprises a fixed orifice plate 214 having a kidney shaped circumferentially extending opening 216 defined by sharp leading and trailing edges positioned so as to overlie a suitably shaped but slightly larger opening 218 provided in the sidewall of housing 196. Suitable seals 220 and 222 are provided which surround both the periphery of fixed orifice plate 214 and surface adjacent the opening 218 in the housing sidewall respectively so as to effectively prevent passage of fluid other than through the respective openings 216, 218. A suitable eccentrically located pin member 219 may be provided which will prevent relative rotational movement of plate 214.

A manually adjustable orifice member 224 is also rotatably positioned within housing portion 208 and includes a lower circular flange member 226 positioned in movable engagement with fixed orifice plate 214. A kidney shaped circumferentially extending orifice 228 (see FIG. 14) is also provided in flange member 226 being of a size slightly smaller than opening 216 and including relatively sharp leading and trailing edges. As shown, opening 228 is movable into and out of overlying relationship with opening 216 so as to thereby vary the size of the resulting passageway therethrough.

Manually adjustable orifice member 224 also includes an upper circular flange member 230 spaced from but interconnected with flange member 226 by a plurality of upwardly extending integrally formed substantially equally spaced posts 232. A center shaft 234 extends upwardly (as shown) through a cover member 236 and has secured to the upper end thereof suitable knob means 238 whereby rotation of orifice member 224 may be effected. A pair of thrust washers 240, 242 are positioned between cover member 236 and flange 230 with suitable bearing means 244 being interposed therebetween. In order to insure a sufficient preloading to maintain orifice member 224 and fixed orifice member 214 in proper position and mutual sealing engagement, shims 246 are provided between thrust washer 240 and cover member 236.

This preload force must be sufficient so that the five integral interconnecting posts 232 will transmit the preload forces uniformly to the adjustable orifice plate 226, the fixed orifice plate 214 and the housing 196. The preload prevents separation of the fixed and movable orifice plates and thus insures substantially zero clearance between the kidney shaped slots 216, 228 and prevents fluid from attempting to lift or bend any plates and thereby increasing the clearance between the plates which may introduce internal leakage to the metering orifice plate system. It should be noted that the orifice plate surfaces that come into contact with each other, either sliding rotary contact or stationary contact, must be optimally flat to insure a good sealing engagement such that fluid cannot enter between them and result in internal leakage which would upset the low flow rate calibrations.

Variable metering orifice assembly 212 comprises a hollow generally cylindrical main housing 248 having a suitably threaded enlarged diameter portion 250 adjacent one end thereof which threadedly engages a suitably internally threaded portion within bore 198 of housing 196 to retain same in assembled relationship therewith. An elongated piston 252 is axially movably disposed within housing 248 and has an elongated bore 254 opening outwardly at one end thereof. A plurality of openings 256 and provided in the sidewall of piston 252 intermediate the ends thereof which allow fluid flowing through openings 228, 216, 218 to pass into bore 254. An integrally formed centrally located threaded stud 258 projects outwardly from the closed end of piston 252.

In order to prevent leakage of fluid directly from inlet opening 204 into bore 254 of piston 252, a pair of rolling diaphragms 260, 262 are provided being secured to piston 252 via rolling diaphragm retainers 264, 266, a face serrated inner spacer 268 and locknut 270 threadedly engaging stud 258. If desired, a suitable dowel pin 272 may be provided extending through diaphragms 260, 262, retainers 264, 266, inner spacer 268 and into piston 252 to effectively prevent any relative rotation between these components. The outer periphery of diaphragms 260, 262 are secured to housing 248 via a pair of face serrated washers 274, 276, an outer face serrated spacer 278 and a cap nut 280 threadedly engaging a threaded outer peripheral portion of housing 248. Similarly, if desired, a suitable dowel pin 282 may be provided to prevent relative rotation between these components.

The opposite end of piston 252 extends axially movably through a bore 283 provided in housing 248 and is suitably sized to provide a very close clearance therebetween to effectively inhibit any leakage flow therebetween. An orifice nut retainer 284 is provided which is threadedly secured to housing 248 by means of a threaded ring portion 286. Orifice nut retainer 284 also includes an axially outwardly spaced internally threaded split ring portion 288 which receives and supports an orifice nut 290. Split ring portion 288 is preferably interconnected with and supported by ring portion 286 via a plurality of integrally formed spaced arms 292 (see FIG. 15) extending therebetween. Split ring portion 288 includes suitable fastener means 294 extending between generally radially outwardly projecting flange portions 296, 298 which fastener means 294 enable a radially inwardly directed clamping force to be exerted on orifice nut 290 to assure it will not be dislodged from split ring portion 288. The terminal end portion 300 of piston 252 is beveled axially and radially outwardly so as to define a sharp edge positioned so as to cooperate with surface 302 of orifice nut 290 to define an annular variable size orifice therebetween. As may now be appreciated, the size of this variable orifice will vary depending upon the position of piston 252 within housing 248. A spring member 304 is also provided acting between an annular radially outwardly projecting flange portion 306 on piston 252 and a corresponding radially inwardly projecting axially spaced flange portion of housing 248 so as to bias piston 252 to the left as seen in FIG. 12.

When in an inoperative condition (i.e. no fluid flow through regulator 194), piston 252 will be biased into a position such that shoulder 310 thereof will rest against a radially inwardly projecting shoulder portion of outer washer 274 and a gasket member 312 disposed between washer 274 and housing 248. Upon initiation of fluid flow from outlet opening 206 and assuming adjustable orifice assembly 210 has been set for a desired flow rate, the pressure $P_o$ at outlet opening 206 will decrease below the prior static level. This drop in pressure $P_o$ will result in movement of piston 252 to the right as shown in FIG. 12 as a result of the higher inlet pressure $P_1$ acting on the left side thereof which will be sufficient to overcome the biasing action of spring 304 as well as the opposing pressure $P_B$ within bore 254. As a result of this movement, end portion 300 of piston 252 will move toward surface 302 of orifice nut 290 thereby reducing the size of this variable orifice and hence restricting fluid flow through regulator 194. As this happens $P_o$ will continue to decrease, however, $P_B$ will increase due to the reduction in size of the variable outlet orifice. Thus, $P_B$ will augment the biasing force of spring 304 to eventually position piston 252 at a location whereby the forces will be balanced and a regulated constant flow rate will be achieved. This flow will enter via inlet opening 204 move upwardly via opening 314 in housing 196 into manually adjustable orifice assembly 210 which will be preset to control the volume thereof via openings 228, 216. The fluid will then flow downwardly through opening 218 into a chamber 316 surrounding housing 248 and then through openings 318 in housing 248 into bore 254, between end portion 300 and surface 302 and then out via outlet opening 206. As will be appreciated, the presence of rolling diaphragms 260, 262 will effectively prevent any leakage flow around moving piston 252 of fluid metered through adjustable orifice assembly 210 and yet will still allow relatively free movement thereof whereby it may easily and effectively compensate for variations in both inlet and outlet pressures thus maintaining substantially constant flow.

It should be noted that flow regulator 194 is also designed so as to inherently dampen oscillating movement of piston 252 so as to maintain a stabilized condition. This is accomplished as a result of the clearances provided between the piston 252 and housing 248 at spring seat flange 306 which will allow restricted fluid flow into and out of annular chamber 320 which is otherwise sealed. The desired degree of dampening may thus be easily controlled by controlling this clearance or alternatively, if less dampening is desired, by providing suitable axially extending openings or grooves of suitable size communicating with these chambers.

Figure 16:
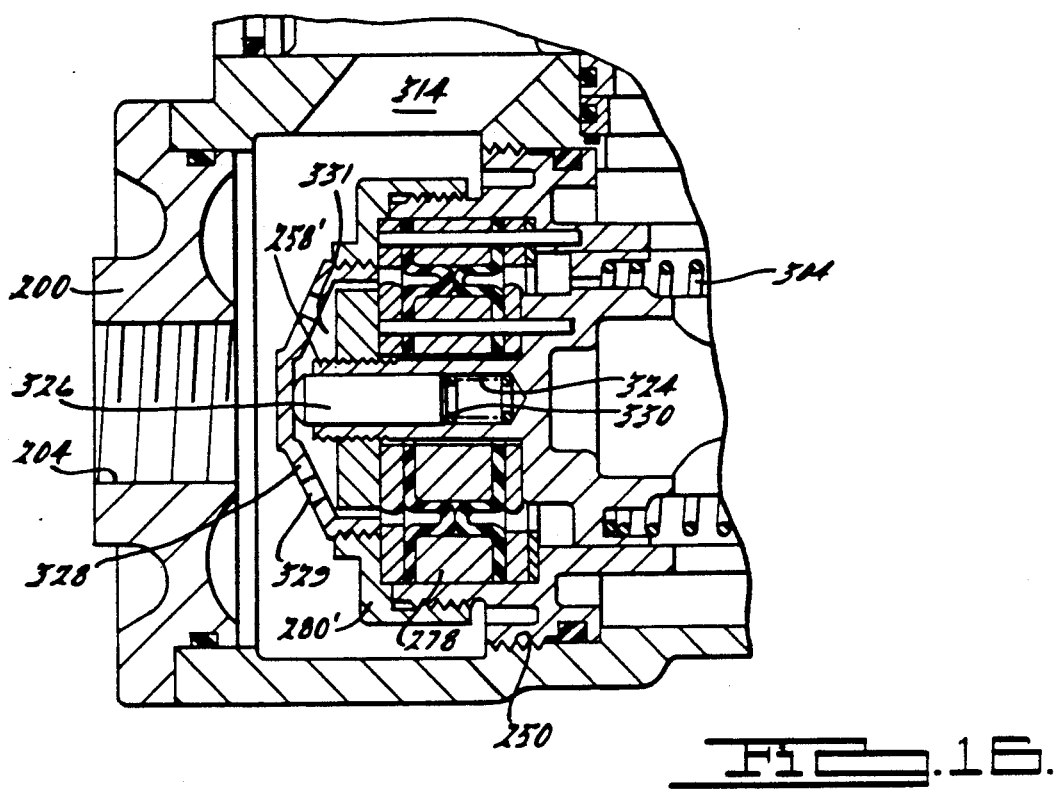
FIG. 16 is a fragmentary section view of an end portion of the valve of FIG. 12 showing an optional oscillation dampening arrangement.

An alternative or additional dampening arrangement may also easily be incorporated into flow regulator 194 if desired. Such an arrangement is illustrated in FIG. 16 and comprises a counterbore 324 provided in stud 258' within which a piston 326 is movably disposed. A suitable retainer 328 may be provided being secured to cap nut 280' to limit outward movement of piston 326 with a spring 330 being disposed within counterbore 324 to retain piston 326 in engagement with retainer 328. Suitable openings 329 in retainer 328 will enable free fluid flow into and out of the area 331 within retainer 328. Thus by controlling the clearance between counterbore 324 and piston 326 and/or providing auxiliary openings, the desired level of dampening may be easily achieved.

Figure 17:
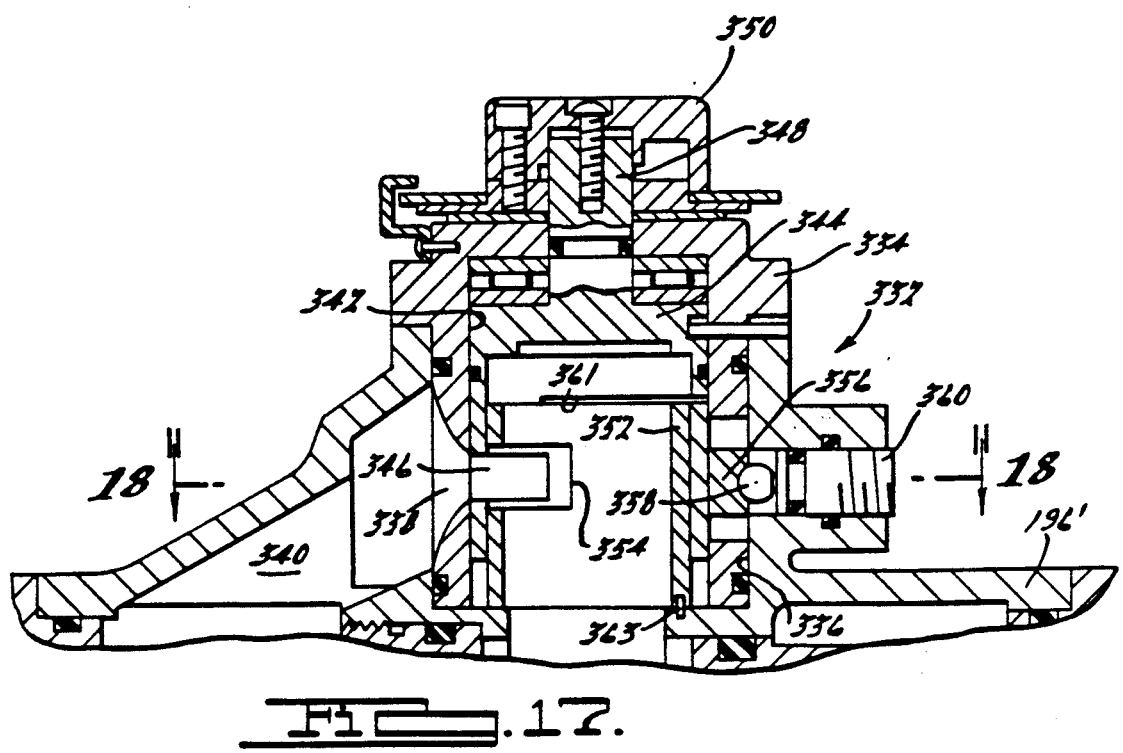
FIG. 17 is a fragmentary section view of the valve assembly of FIG. 12 showing an alternative adjustable orifice arrangement.
Figure 18:
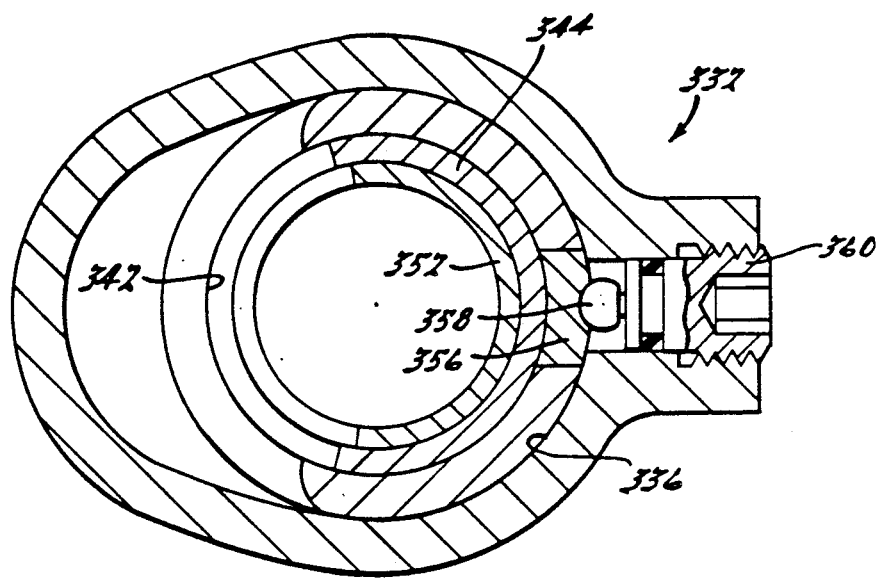
FIG. 18 is a fragmentary section view of the alternative adjustable orifice arrangement of FIG. 17, the section being taken along line 18—18 thereof.

Referring now to FIGS. 17 and 18, there is illustrated an alternative manually adjustable orifice assembly which may be employed in place of manually adjustable orifice assembly 210 described above. Manually adjustable orifice assembly 332 comprises a housing 334 adapted to be received within a generally radially extending bore 336 provided in housing 196'. Housing 334 is generally cylindrical and includes a circumferentially extending slot 338 opening inwardly from a passage 340 in housing 196' into an internal axially elongated bore 342. A hollow generally cylindrically shaped member 344 is rotatably positioned within bore 342 and includes a circumferentially elongated slot 346 movable radially into and out of alignment with slot 338 to define the adjustable orifice. A suitable upwardly projecting shaft 348 integrally formed with member 344 is provided to which a suitable knob 350 is secured whereby rotation of member 344 may be effected.

In order to prevent leakage of fluid between members 334 and 344, an inner cylindrical liner 352 is provided having a suitable cutout portion 354 so as to not interfere with slot 346 being positioned within member 344. Preferably, slot 354 will be larger in both axial width and circumferential extent than both slots 338 and 346. A cutout portion is provided in member 334 through which a pad 356 projects which has an inner surface slidingly bearing against an outer wall surface of member 344. A ball stud 358 is also provided which is urged into engagement with pad 356 by means of adjustment screw 360. Thus, as screw 360 is tightened, ball 358 will move pad 356 inwardly against member 344 and liner 352 thereby deforming them from a generally cylindrical shape into a somewhat elliptical shape which in turn will urge the sidewalls of member 344 into secure sealing engagement with the sidewalls of housing 334. Preferably, member 344 will be fabricated from a suitable polymeric composition so that it may be more easily elastically deformed to insure this sealing engagement. Additionally, a relatively small slot 361 may be provided in member 344 located above slot 346 and the top of member 352 and extending from approximately 180° to 270° therearound in order to render the area adjacent slot 346 more flexible and hence more easily deformed into an elliptical shape. A second similar slot may be provided below slot 346 to further increase this flexibility. One or more pin members 363 are provided extending between housing 196' and the end of sleeve 352 to prevent relative rotation between sleeve 352 and member 334 as member 344 is rotated.

Figure 19:
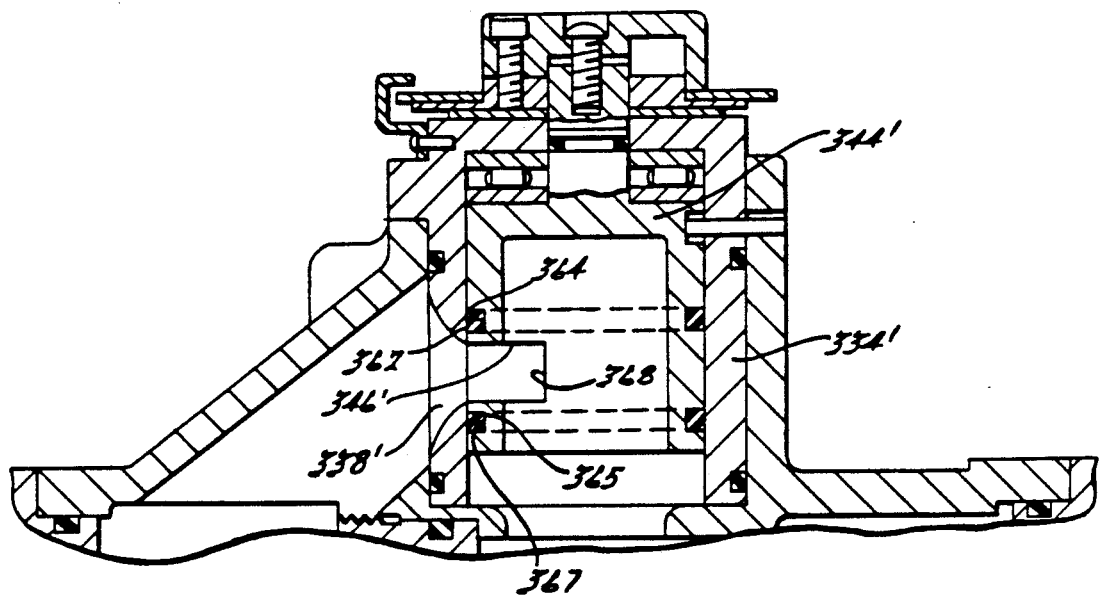
FIG. 19 is a view similar to that of FIG. 17 but showing a modification thereof, all in accordance with the present invention.

FIG. 19 shows an alternative arrangement by which effective sealing of the manually adjustable orifice assembly 332 may be accomplished, corresponding portions thereof being indicated by like numbers primed. In this embodiment, a pair of suitable O-ring seals 362, 365 are positioned within grooves 364, 367 extending around member 344' and being slightly axially spaced from slot 346' and sealingly engage the inner periphery of member 334'. This arrangement enables seal 362, 365 to maintain a tight sealing engagement with the inner surface of housing 334' regardless of whether slot 346' is positioned in a fully overlapping open position with respect to slot 338' or in a fully closed position.

Thus, as may now be appreciated, flow control valve 194 is well suited for providing substantially constant fluid flow rates with virtually zero leakage as a result of the unique sealing arrangement incorporated therein. The various components incorporated therein may be easily and conveniently fabricated from suitable polymeric compositions or if desired from various metals. Further, valve 194 may be easily adapted for various flow rate ranges by proper sizing of bore 252 and end portion 300 so as to thereby control the resulting annular orifice area. While this valve is particularly useful in applications requiring very precise control of low volume flow rates where leakage flow is of greatest significance, it is equally well suited for precise control situations in high flow rate applications.

While it will be apparent that the preferred embodiments of the invention disclosed are well calculated to provide the advantages and features above stated, it will be appreciated that the invention is susceptible to modification, variation and change without department from the proper scope or fair meaning of the subjoined claims.

I claim:

1. An improved substantially zero leakage constant flow control valve comprising:
   a housing having a fluid inlet and a fluid outlet spaced from said inlet;
   an adjustable orifice assembly disposed within said housing downstream from said inlet opening;
   a variable orifice assembly disposed within said housing upstream from said discharge opening, said variable orifice assembly including an axially movable piston member operative to vary the size of said orifice in response to inlet and discharge fluid pressures;
   said adjustable orifice assembly and said variable orifice assembly cooperating to define an inlet pressure chamber within said housing adjacent said inlet opening, a discharge pressure chamber within said housing adjacent said outlet and an intermediate pressure chamber within said housing between said inlet and outlet pressure chamber; and
   sealing means including a pair of spaced rolling diaphragms sealingly secured between said piston and said housing, said diaphragms being operative to effectively inhibit leakage fluid flow between said inlet and intermediate pressure chamber so that virtually all fluid flow is metered through said adjustably fixed orifice and regulated through said variable orifice whereby said flow control valve may operate to assure substantially constant precise flow at low flow rates.

2. An improved substantially zero leakage constant flow control valve comprising:
   a housing having a fluid inlet and a fluid outlet spaced from said inlet;
   an adjustable orifice assembly disposed within said housing downstream from said inlet opening;
   a variable orifice assembly disposed within said housing upstream from said discharge opening, said variable orifice assembly including an axially movable piston member operative to vary the size of said orifice in response to inlet and discharge fluid pressures;
   said adjustable orifice assembly and said variable orifice assembly cooperating to define an inlet pressure chamber within said housing adjacent said inlet opening, a discharge pressure chamber within said housing adjacent said outlet and an intermediate pressure chamber within said housing between said inlet and outlet pressure chamber;
   sealing means for effectively sealing said inlet pressure chamber so that virtually all fluid flow is metered through said adjustably fixed orifice and regulated through said varible orifice whereby said flow control valve may operate to assure substantially constant precise flow at low flow rates; and
   dampening means within said housing for dampening reciprocable movement of said piston, said dampening means including a secondary piston telescopically received within a bore provided in said piston, and spring means within said bore operative to bias said secondary piston outwardly and into engagement with a portion of said housing.

3. A flow control valve as set forth in claim 1 wherein said piston member includes a surface in part defining said inlet pressure chamber, inlet fluid pressure acting against said surface to urge said piston in a first direction.

4. A flow control valve as set forth in claim 3 wherein said piston includes a second surface in part defining said discharge pressure chamber, discharge fluid pressure acting against said surface to urge said piston in a second direction, said second direction being opposite to said first direction.

5. A flow control valve as set forth in claim 4 wherein said piston is hollow and includes an interior surface in part defining said intermediate pressure chamber, intermediate fluid pressure acting against said surface to urge said piston in said second direction, movement of said piston in said first direction being operative to decrease the size of said variable orifice and movement of said piston in said second direction being operative to increase the size of said variable orifice.

6. A flow control valve as set forth in claim 5 further comprising biasing means operative to urge said piston in said second direction.

7. A flow control valve as set forth in claim 1 wherein said piston is movably supported within a piston housing, said piston housing being sealingly secured within said housing.

8. A flow control valve as set forth in claim 2 wherein said sealing means include rolling diaphragm means sealingly secured between said piston and said piston housing, said diaphragm means being operative to effectively inhibit leakage fluid flow between said inlet and intermediate pressure chambers.

9. A flow control valve as set forth in claim 8 wherein said diaphragm means includes a pair of spaced diaphragms secured between one end of said piston housing and said piston.

10. A flow control valve as set forth in claim 7 further comprising means within said piston housing for dampening reciprocable movement of said piston.

11. A flow control valve as set forth in claim 10 wherein said dampening means comprise fluid receiving spaces disposed between said piston and said piston housing, said fluid receiving spaces communicating with said intermediate pressure chamber via a restricted clearance path between said piston and said piston housing.

12. A flow control valve as set forth in claim 10 wherein said dampening means comprise a secondary piston telescopically received within a bore provided in said piston, and spring means within said bore operative to bias said secondary piston outwardly and into engagement with a portion of said piston housing.

13. A flow control valve as set forth in claim 1 wherein said adjustable orifice assembly includes a first member sealingly secured to said housing in nonrotatable relationship thereto, said first member having an opening therein, a second member sealingly supported within said housing for rotational movement with respect to said first member, said second member having an opening movable into and out of alignment with said opening in said first member to thereby define an adjustable orifice.

14. A flow control valve as set forth in claim 10 further comprising means external of said housing for effecting rotational movement of said second member.

15. A flow control valve as set forth in claim 10 wherein said first and second members comprise plates having planar surfaces positioned in mutual sealing relationship.

16. A flow control valve as set forth in claim 10 wherein said first and second members comprise concentrically disposed generally cylindrical members.

17. A flow control valve as set forth in claim 16 wherein said openings in said first and second cylindrical members are disposed in sidewalls thereof and further comprising means engaging the sidewall of said second member diametrically opposite said opening and operative to exert a biasing force thereon whereby the sidewall of said second member surrounding said opening is urged into a fluid tight sealing relationship with the sidewall of said first member surrounding said opening.

18. A flow control valve as set forth in claim 17 wherein said piston is movably supported within a piston housing, said piston housing being sealing secured within said housing.

19. A flow control valve as set forth in claim 18 wherein said sealing means include rolling diaphragm means sealingly secured between said piston and said piston housing, said diaphragm means being operative to effectively inhibit leakage fluid flow between said inlet and intermediate pressure chambers.

20. A flow control valve as set forth in claim 19 wherein said diaphragm means includes a pair of spaced diaphragms secured between one end of said piston housing and said piston.

* * * * *

UNITED STATES PATENT AND TRADEMARK OFFICE
CERTIFICATE OF CORRECTION

PATENT NO. : 5,000,219

DATED : March 19, 1991

INVENTOR(S) : Frank A. Taube, Sr. et al

It is certified that error appears in the above-identified patent and that said Letters Patent is hereby corrected as shown below:

Column 1, line 46, "electroncis" should be --electronics--.

Column 2, line 2, "adjusting" should be --adjustable--.

Column 4, line 7, after "overall" insert --axial--.

Column 4, line 61, "circumferentially" should be --circumferential--.

Column 5, line 7, "other" should be --outer--.

Column 5, line 43, "oted" should be --noted--.

Column 5, line 64, after "noted" insert --that--.

Column 8, line 45, "adjustable" should be --adjustably--.

Column 8, line 65, "number" should be --member--.

Column 9, line 18, "Alterantively" should be --Alternatively--.

UNITED STATES PATENT AND TRADEMARK OFFICE
CERTIFICATE OF CORRECTION

PATENT NO. : 5,000,219

DATED : March 19, 1991

INVENTOR(S) : Frank A. Taube, Sr. et al

It is certified that error appears in the above-identified patent and that said Letters Patent is hereby corrected as shown below:

Column 11, line 38, "and" should be --are--.

Column 16, line 31, Claim 14, "10" should be --13--.

Column 16, line 34, Claim 15, "10" should be --13--.

Column 16, line 38, Claim 16, "10" should be --13--.

Signed and Sealed this

Fifth Day of October, 1993

Attest:

BRUCE LEHMAN

*Attesting Officer*     *Commissioner of Patents and Trademarks*